Sept. 14, 1965  H. G. PYLES  3,205,951
FACE DRILLING MACHINE
Filed Feb. 1, 1963  5 Sheets-Sheet 1
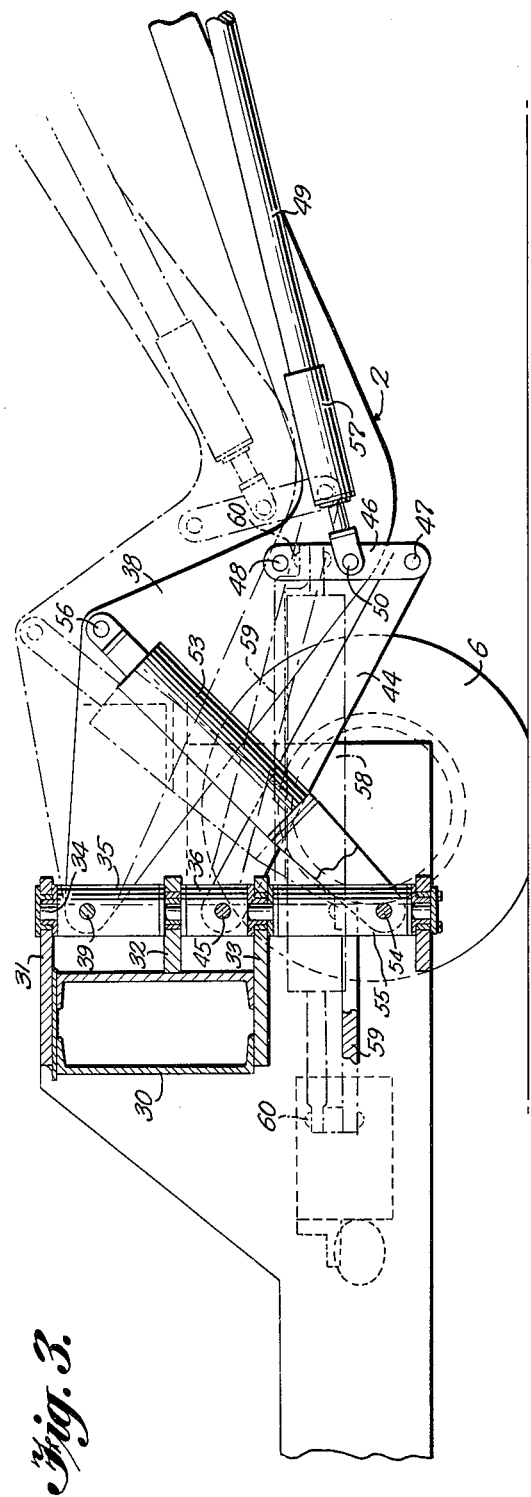

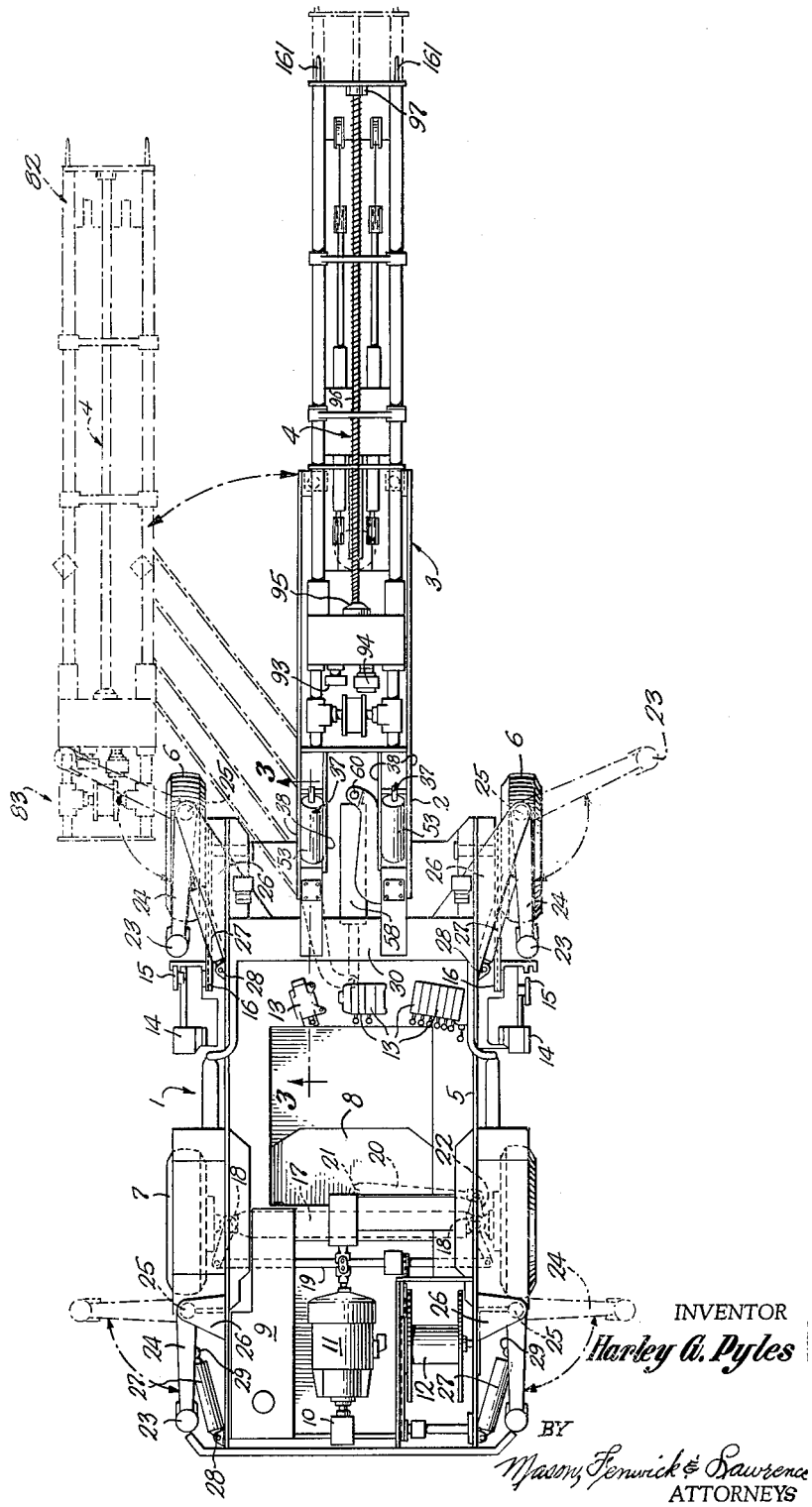

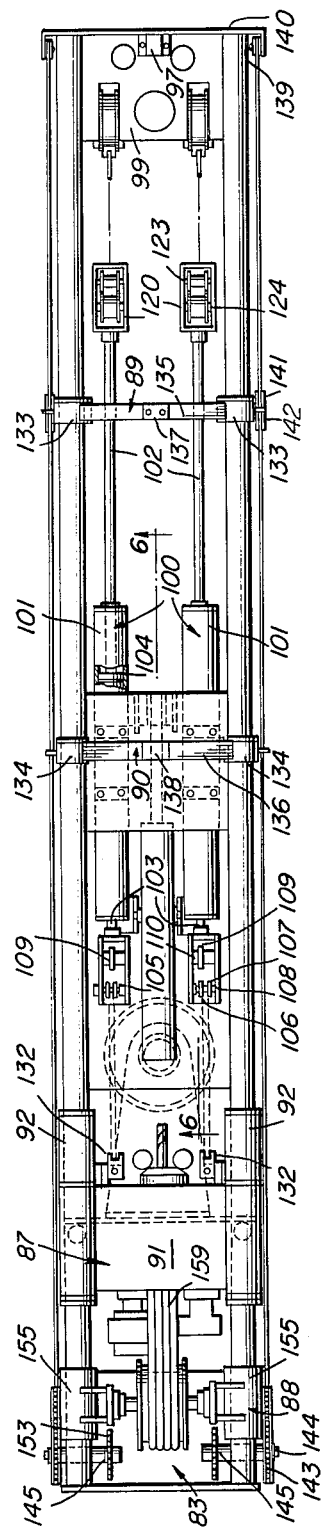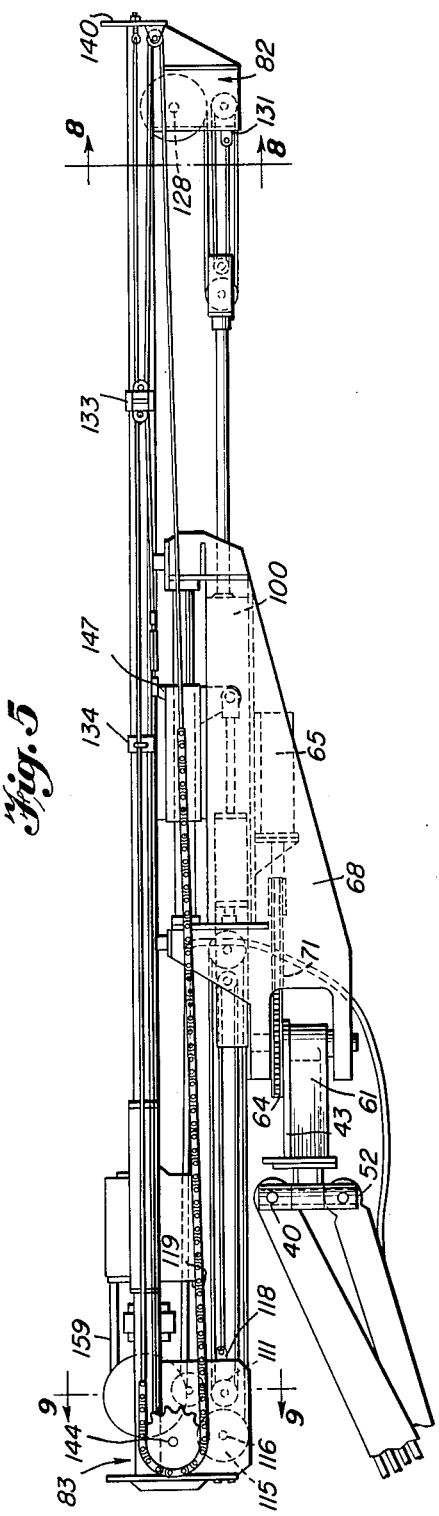

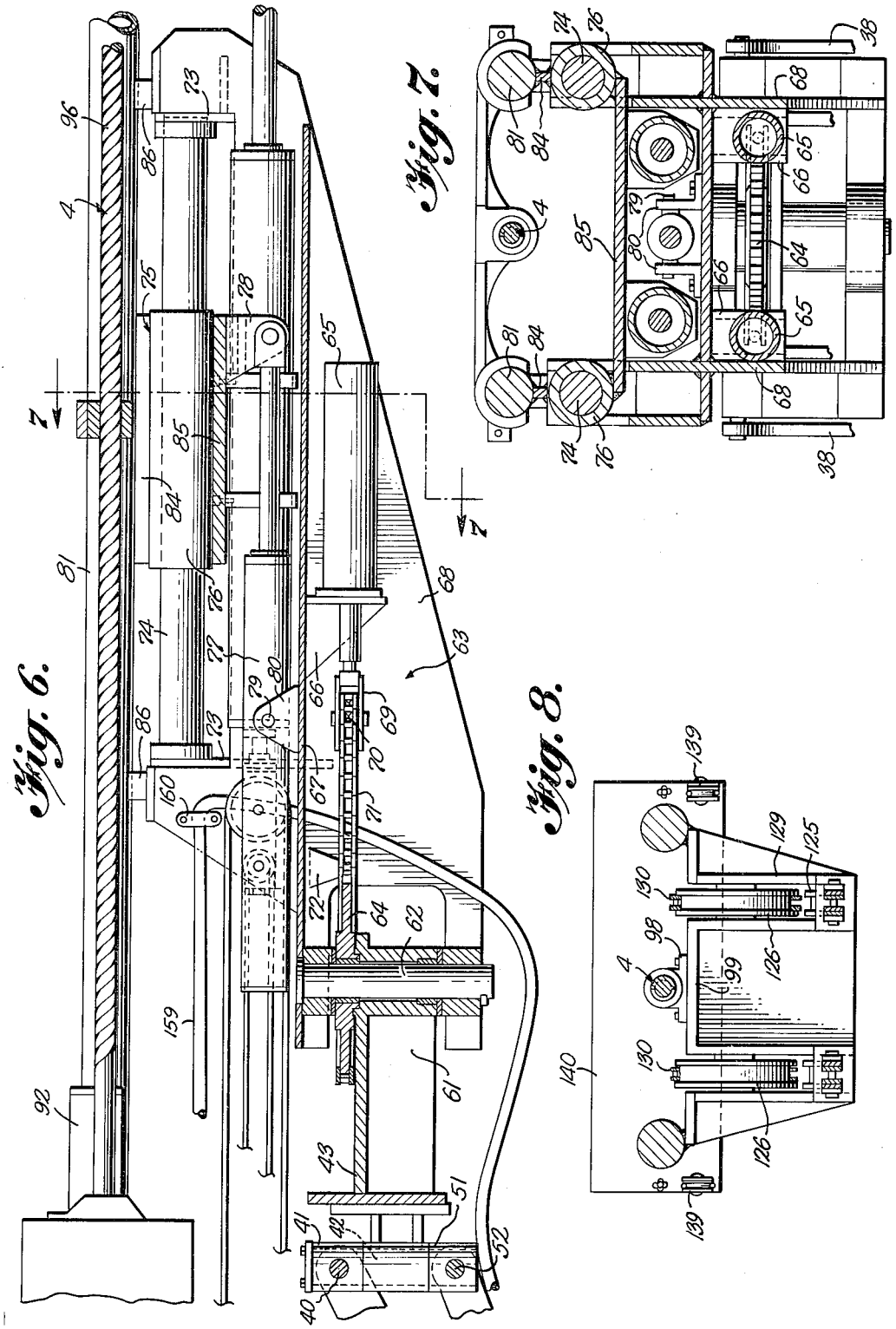

Sept. 14, 1965　　　　　　　　H. G. PYLES　　　　　　　　3,205,951
FACE DRILLING MACHINE
Filed Feb. 1, 1963　　　　　　　　　　　　　　　　5 Sheets-Sheet 5
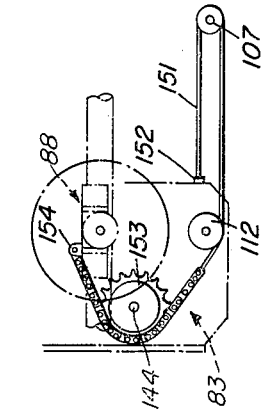
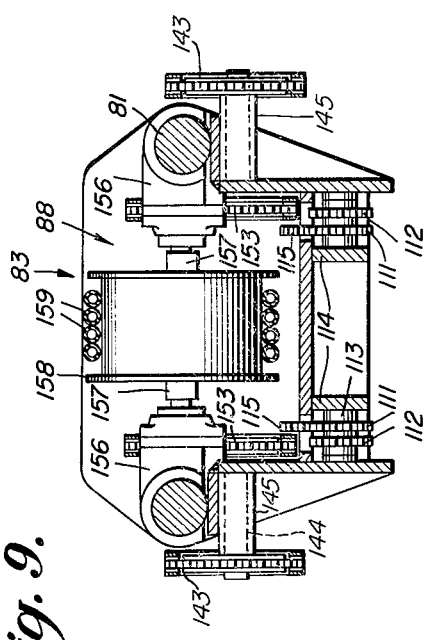
INVENTOR
*Harley G. Pyles*
BY
ATTORNEY

United States Patent Office 3,205,951
Patented Sept. 14, 1965

3,205,951
FACE DRILLING MACHINE
Harley G. Pyles, Fairmont, W. Va., assignor, by mesne assignments, to Galis Manufacturing Company, Fairmont, W. Va., a corporation of West Virginia
Filed Feb. 1, 1963, Ser. No. 256,216
5 Claims. (Cl. 173—43)

This invention relates to mining machines and particularly to machines for drilling into a mine face.

Face drilling machines are in use which embody a self propelled vehicle having a vertically and laterally swingable boom at the front, with a feed rack carried by the boom and capable of parallel movement vertically and horizontally as a result of boom movement, and independent sumping, vertical tilting and horizontal rotational movement. A drill head is mounted upon a carriage movable along the feed rack. These machines are run into a mine up to the face to be worked, and the feed rack adjusted to position the drill, or auger, where desired. The drill head carriage is then moved forward as drilling progresses.

The holes drilled are usually quite deep, extending from eight to twelve feet. In heavy duty work particularly, the long auger required for depth drilling needs support intermediate the drill head and auger guide at the front end of the feed rack. Obviously, the more support that can be given the auger the better, for auger whip and vibration will be reduced to a minimum. It is necessary, however, to utilize substantially the entire feed rack for drill head movement and stationary guides cannot be used.

The general object of the present invention is to provide an improved face drill having a feed rack which will ensure proper auger support and freedom of drill head carriage movement throughout the full range of travel of the drill head carriage along the rack.

A more specific object is to provide such a drill which has a feed rack having means to support the auger intermediate the fixed guide at the rack front and the drill head, which maintains support for the auger at proportionately spaced points between the drill head and fixed guide, irrespective of movement of the drill head toward and from the fixed guide.

A still more specific object of the invention is to provide auger supports which are movable along a feed rack, and couple the supports to means for moving the drill head in such manner that the movement of the supports and the drill head are at predetermined proportional rates, so that the auger will be supported at uniformly spaced points at all times.

Another object of the invention is the provision of means on the rack to support hose lines supplying fluid to the drill head to prevent loop in the hose lines adjacent the drill head during movement of the drill head along the feed rack, and possible entanglement of the hose lines.

Still another object is to provide a travelling hose line support, movable in one direction by means interconnecting the drill head carriage drive and the auger support moving means.

Other objects of the invention will become apparent from the following description of one practical embodiment thereof, when taken in conjunction with the drawings which accompany, and form part of, this specification.

In the drawings:

FIGURE 1 is a side elevation of the face drilling machine;

FIGURE 2 is a top plan view;

FIGURE 3 is a vertical section through the boom mount taken on line 3—3 of FIGURE 2;

FIGURE 4 is a top plan view of the feed rack on an enlarged scale;

FIGURE 5 is a side elevation of the feed rack;

FIGURE 6 is an enlarged vertical longitudinal section through the central portion of the feed rack and its mount, and is taken on line 6—6 of FIGURE 4;

FIGURE 7 is a vertical section through the feed rack taken on the line 7—7 of FIGURE 6;

FIGURE 8 is a vertical transverse section through the rack taken on the line 8—8 of FIGURE 5;

FIGURE 9 is a vertical transverse section through the feed rack, taken on line 9—9 of FIGURE 5;

FIGURE 10 is a diagrammatic view of the flexible drive for the auger guide carriages;

FIGURE 11 is a similar view of the drive for the drill head carriage; and

FIGURE 12 is a diagrammatic view of the hose line carriage control means.

In general, the invention concerns a heavy duty face drill having an improved auger feed rack. The rack includes a pair of rails upon which a drill head carriage, a hose line support carriage and at least two auger guide supports are mounted for sliding movement toward and from a fixed auger guide mounted at one end of the rack. Means are provided to impart predetermined proportional movement to the several movable members to maintain preselected relationship between them.

Referring to the drawings in detail, and first adverting particularly to FIGURES 1 and 2, there is shown a mobile face drill suitable for use in mines. The apparatus includes a powered car 1 which has a boom 2 mounted at its front to carry, and position, a drill feed rack 3. A drill 4 is mounted for movement longitudinally of the feed rack.

Car 1 can be of any desired form, and is shown as comprising a combined frame and body 5, mounted upon driven front wheels 6 and steerable rear wheels 7. A seat 8 for an operator is provided centrally of the car. The various mechanisms of the apparatus are hydraulically operated, and a reservoir 9 for the hydraulic fluid is carried on the car. The fluid is forced to the several operating mechanisms by a pump 10, operated by an electric motor 11. Electric cable, of sufficient length to permit connection to a distant outlet, is carried upon a reel 12. The control valves for the various hydraulic operators are located within the operator's cockpit, as shown at 13. For simplicity, the fluid lines from pump 10 to the hydraulic operators and to the control valves have not been shown. The manner of connecting these elements is well known.

The front wheels of the car are independently driven, each having its fluid motor 14. The motors are connected to speed reducers 15, and the speed reducers drive the wheels through chains 16. The motors 14 can be run separately, or at different speeds, to assist in the steering of the vehicle, if desired.

Rear wheels 7 are pivotally connected to an axle 17, as at 18, and interconnected by tie rod 19 for simultaneous steering action. A hydraulic steering jack 20 is coupled between the vehicle frame, at 21, and a steering arm 22 projecting from one wheel mount. Operation of the jack causes steering movement of the wheels.

Adjacent each wheel of the car there is a ground-engaging stabilizer jack 23. Each jack is mounted at one end of the outrigger 24 having its other end pivotally connected at 25 to bracket arms 26 projecting outwardly from the car body. Swing jacks 27 are pivotally connected to ears 28 on the car body and to ears 29 on the outriggers for swinging the outriggers from positions approximately parallel to the car sides (as shown in full lines) to positions in which they project outwardly from the car body (as shown in dotted lines). When the outriggers are in extended position, and the stabilizing jacks are in ground engagement, the apparatus base is effectively enlarged. Both the stabilizing jacks 23 and the swing jacks 27 are hydraulically operated.

At the front of the car, there is a beam 30, extending transversely of the car and providing a mounting sill for boom 2. Brackets 31, 32 and 33 project forwardly from sill 30 and support a pair of vertical pins 34. Sleeves 35 and 36 are rotatable on each pin 34, and the boom members are pivotally connected to the sleeves. The boom is composed of two horizontally spaced arms 37, and each arm is made up of two horizontally spaced members 38. The members 38 of each arm are pivotally connected to opposite sides of one of the sleeves 35, as at 39. The opposite ends of the members 38 of each arm are pivotally connected, at 40, to opposite sides of sleeves 41, rotatably mounted on pins 42, supported in a bracket 43. Links 44 are attached at one end to sleeves 36, as at 45, and at their opposite ends to the bottoms of levers 46, as at 47. The levers are pivotally mounted at 48 between the members of the arms of the boom. Control links 49 are pivotally connected to levers 46, at 50, intermediate pivots 47 and 48, and to sleeves 51 on pins 42, at 52. It is to be noted that pivots 39, 45, 47 and 48 lie at the corners of a parallelogram, and as pivots 39 and 45 lie vertically one above the other, pivots 47 and 48, and levers 46 will remain in vertical position during all vertical swinging movement of the boom arms about their pivots 39. Pivots 48, 50, 52 and 40 lie at the corners of a second parallelogram, and consequently, pins 42 will remain vertical and hold bracket 43 against tilting during all boom movement. The boom is raised and lowered by means of boom lifting jacks 53, pivoted at 54 to sleeves 55, also mounted on pins 34. The opposite ends of the lift jacks are connected to the boom arms at 56. The control links 49 include jacks 57 to make the links variable in length. Consequently, operation of the tilt jacks 57 will lengthen, or shorten, the links and tilt pins 42 from the vertical and so cause bracket 43 to tilt.

By referring particularly to FIGURE 2, it will be seen that the pairs of pins 34 and 42 form the corners of a horizontal parallelogram to allow the boom arms to swing laterally while maintaining the bracket 43 parallel to the longitudinal axis of the machine. This movement is also controlled by a hydraulic jack. In this instance, boom swing jack 58 will be interposed between the ends of arms 59 projecting from the sleeves 35 to which the boom arms are pivoted. Arms 59 from the respective sleeves 35 extend in opposite directions, and boom swing jack 58 is pivotally connected to each arm as at 60. It will be obvious that extension and retraction of jack 58 will cause the arm ends to separate and approach each other. This will result in identical lateral swinging movement of the boom arms and horizontal movement of bracket 43.

Bracket 43 has a forwardly projecting leg 61 in which a king pin 62 is carried. The ends of the king pin extend above and below leg 61 to receive the legs of a feed rack mount 63. The mount can swing horizontally about the axis of pin 62. The pin also carries a sprocket 64, which is fixed relative to the bracket 43.

Feed rack mount 63 is rotated about the king pin axis by means of a pair of rack swing jacks 65. The cylinders of these jacks are fixed connected to base pads 66, which depend from a horizontal bridge member 67 extending between the side plates 68 of the feed rack mount. The piston rods of jacks 65 have travelling blocks 69 at their outer ends, each carrying a sprocket 70. A chain 71 has one end anchored to an ear 72 depending from bridge 67, passes around one sprocket 70, then around the fixed sprocket 64, around the other sprocket 70 and has its opposite end anchored to a second ear 72. By means of this arrangement, reverse operation of jacks 65 will cause one sprocket 70 to move forward on chain 71 toward sprocket 64 while the other moves away from sprocket 64. This will result in the feed rack mount being turned about the king pin axis. By using the sprockets 70 rather than attaching the chain ends directly to the jacks 65, the amount of jack operation necessary to rotate the feed rack mount through a given arc is greatly reduced.

Mount 63 has spaced ears 73 projecting laterally outward from side plates 68 to support the ends of horizontal sumping rails 74. Feed rack 3 has a mounting carriage 75 which includes sleeves 76 at each side, mounted upon the sumping rails 74 for sliding movement therealong. A sumping jack 77 has its piston rod connected to a lug 78 depending from carriage 75, and its cylinder mounted upon trunnions 79 supported upon brackets 80 fixed to the bridge 67 of the feed rack mount. Operation of the jack will cause the feed rack carriage 75, and the feed rack carried thereby, to move longitudinally upon the sumping rails 74.

The feed rack is composed principally of a pair of parallel, horizontally spaced, tubular feed rails 81 connected at their ends by end assemblies 82 and 83. The feed rails are attached, as by welding, to the top edges of the sides 84 of the mounting carriage 75. The bed of carriage 75 may be a plate 85, welded to the bottoms of the sleeves 76. With this arrangement, the feed rack and mounting carriage are an integral unit, free to move longitudinally along rails 74 when the jack 77 is operated. In order to distribute the weight of the feed rack and to obtain additional support for the rack, seats 86 may be secured at the corners of the feed rack mount 63. The bottoms of feed rails 81 will reset upon, and slide along, seats 86 when the rack is at rest and during sumping movement.

Mounted on the feed rack for movement along rails 81 are a drill head carriage 87, a hose line carriage 88, and two intermediate auger guide carriages 89 and 90. Each of these carriages is positively moved along the feed rack in a manner to be described.

The drill head carriage includes a drill head housing 91 to which slides 92 are attached. The slides are incomplete cylinders and partially encircle rails 81 for free sliding movement therealong. A motor 93 to rotate the auger, and a motor 94 to provide percussive impact to the auger are mounted at the back of the housing 91. The necessary gearing, etc. to transmit the several motions to the auger are contained within the housing 91. As the auger drive forms no part of the present invention, it has not been illustrated. The drive may be of the type disclosed in co-pending application S.N. 255,424 filed January 24, 1963, entitled "Rotary Percussion Rock Drilling Apparatus," which application is a continuation-in-part of application Serial No. 835,880, filed August 25, 1959. An auger chuck 95 projects from the front of the drill head housing to receive an auger 96. The auger will be supported by the auger guide carriages 89 and 90, and by a fixed front guide 97, mounted in a block 98 carried on the bed plate 99 of the front end assembly 82 of the feed rack. As the drill head carriage moves forwardly to feed the auger into the mine face, the guide carriages 89 and 90 will move forward proportionately, to maintain equal spacing between the guides 97, 89 and 90 and the drill head so that uniform guiding support will be provided to the auger.

The drill head carriage is moved along the feed rack by means of feed jacks 100 bolted to the underside of the bed plate 85 of the mounting carriage 75. The cylinders 101 of these jacks are apertured at both ends to permit double ended piston rods to project through. Each double ended rod has a forwardly projecting portion 102 and a rearwardly projecting portion 103. The two ends move simultaneously, being connected to a common piston 104. The rearward rod ends 103 carry yokes 105 each mounting several sprockets. A pair of small sprockets 106 and 107 are independently rotatable on a rear shaft 108 in the yoke, and a larger sprocket 109 is mounted on a forward shaft 110, with the sprockets 106 and 109 lying in the same vertical plane. A pair of sprockets 111 and 112 are independently rotatable on a shaft 113 held in vertical supports 114 of the rear end assembly 83 of the feed rack. A larger sprocket 115 is mounted on shaft 116, fixed to the same supports 114 but to the rear of shaft 113. A drive chain 117 has its end secured to an anchor 118 on supports 114 and extends forwardly and around sprocket 106, then rearwardly around sprocket 111 and forwardly and over sprocket 109. The chain then passes to the rear and around sprocket 115 and is attached to an anchor 119 on the drill head carriage. A similar chain is trained about the gears associated with the rearwardly projecting rod of the other feed jack. The forwardly projecting rods 102 also carry yokes 120. These have pullies 121 and 122 rotatable upon shafts 123 and 124. The front end assembly 82 carries pullies 125 and 126 on shafts 127 and 128 mounted in vertical supports 129 depending from the bed plate 99. Chains 130 have their ends connected to anchors 131 on the front end assembly, and extend rearwardly around pullies 121 and forward and around pullies 127. The chains then extend to the rear and about pulies 122 and forwardly over pullies 126. The other ends of the chains are carried rearwardly and connected to anchors 132 on the drill head carriage. This will provide for positive drive of the drill head carriage in both directions along the feed rack. When the feed rack pistons 104 are moved rearwardly in the cylinders, the carriage 87 will move forwardly in a drilling direction. Of course, the multiplication of the chain flights and the use of the travelling sprockets provide great carriage travel for small jack movement.

Guide carriages 89 and 90 are quite similar to one another. They have incomplete cylinder rail slides 133 and 134, respectively, connected by bridge bars 135 and 136. Carriage 89 has an auger guide 137 mounted at the center of its bridge bar, and carriage 90 has a similar guide 138 similarly mounted.

In order to secure movement of the guide carriage proportionately to that of the drill carriage and to one another to maintain the equal spacing mentioned above, a drive for the guide carriages is provided which is driven, in turn, from the drill carriage feeding means. The guide carriage drive is positioned along the outside edges of the feed rack. The drive is identical on both sides of the rack to ensure even pull on the guide carriages. The drive includes a pulley 139, fixed to the end plate 140 of front end assembly 82, a pair of pullies 141 and 142 carried by the rail slide of guide carriage 89, and a sprocket 143 fixed to a shaft 144 rotatably mounted in a sleeve 145 forming part of the rear end assembly 83. A cable 146 has one end anchored to an ear 147 on the feed rack mounting carriage 75, and is trained over pulley 142 on guide carriage 89. The opposite end of cable 146 is connected to one end of a length of chain 148 which passes around sprocket 143. Cable 146 is also fixedly connected to the guide carriage 90 as at 90'. Another length of cable 149 is anchored to an eye bolt 150 on end plate 140 of front end assembly 82, and is trained over pullies 141 and 138 in succession and then connected to the other end of chain 148. The multiplication of cable flights and the relative sizes of the several pullies and sprocket 143 are chosen so that the guide carriage 90 will travel at twice the speed of the guide carriage 89. If, therefore, the speed travel of the drill head carriage is three times that of the guide carriage 89, the guides carried by the two guide carriages will always occupy positions so as to divide the distance between the drill head and fixed guide 97 into thirds.

The proper ratio of movement between the guide carriages and the drill head carriage is obtained by interconnecting the guide and drill head carriage drives. This is done by using control chains 151 at each side of the machine. Each chain is connected by means of an anchor 152 to the rear end assembly 83. The chain is brought forward, around sprocket 107 in yoke 105, then rearward beneath procket 112 on the rear end assembly, and around a large sprocket 153 fixed to shaft 144. The end of the chain is then attached to the hose line carriage 88, as at 154. Thus, each time the feed packs 100 are actuated to move the drill head carriage, sprockets 107 will be moved to actuate control chains 151 and rotate sprockets 153. As sprockets 153 and 143 are fixed to shaft 144, the guide drive will be operated simultaneously with the drill head carriage drive. The ratio of movement required is obtained by the use of sprockets of proper size. Due to the fact that the control chains 151 have one end anchored to the hose line carriage 88, the movement of that carriage will be controlled by chains 151.

Carriage 88 also has incomplete cylinder slides to ride on feed rails 81. These slides 155 each carry a mounting block 156 to receive one end of a reel shaft 157. A hose reel 158 is carried by the shaft centrally of the carriage, and is freely rotatable. Hose lines 159 extend from the car 1 up along boom 2 to the feed rack where they are attached at a mid point 160. The lines are then carried rearwardly, around reel 158 and connected to the drill head carriage. These lines may supply fluid for operating motors 93 and 94 and for cooling the drill.

As the hose lines are attached to the drill head carriage, feeding movement of the drill head carriage along the feed rack will draw the hose line carriage behind it. Reel 158 will act as a pulley around which the hose lines pass and will rotate as the carriage moves. The hose line carriage will move at one-half the speed of the drill head carriage under the control of chains 151 so that the hose lines will be held taut at all times and the hose line carriage will never move forward beyond the mid-section of the feed rack. During retraction of the drill, chains 151 will draw the hose line carriage back to its position of rest.

In operating the device, the drilling machine is run into the mine and positioned relative to a face to be drilled. Stabilizing jacks 23 are swung outwardly, on outriggers 24 and set against the ground. Boom 2 is raised or lowered as required by operation of lift jacks 53. The boom can be swung to one side or the other, if necessary, by means of the boom swing jack 58. In all of these movements, the feed rack will remain horizontal and parallel to the longitudinal axis of the car 1 due to the parallelogram arrangement of the boom members. The feed rack can be tilted vertically by operation of the tilt jacks 57, or rotated about king pin 62 by means of the rack swing jacks 65. After the rack has been positioned relative to the face, it is moved forward by sumping jack 77 to sink the picks 161, at the front of the feed rack, into the face to locate the rack for drilling and to stabilize the front end of the rack.

When the rack is located, the motors 93 and 94 are started and their controls set in accordance with the requirements of the particular drilling operation to be performed. The machine is now ready for drilling to begin.

Operation of feed jacks 100 will cause the drill head carriage to move forward bringing the auger 96 into drilling engagement with the face. The feed jacks will maintain a predetermined pressure upon the auger in a drilling direction, and as drilling progresses the drill head carriage 87 will move forward holding the auger against the hole bottom.

It is apparent that the guides 89 and 90 will move forward simultaneously with the drill head carriage but at a different rate. By having the control and driving mechanism designed to cause guide carriage 90 to move at two-thirds the speed of the drill head carriage, and guide carriage 89 at one-third the drill head carriage speed, the guides on the guide carriages will maintain support for the auger at equal spacings between the drill head carriage and the fixed guide 97. Thus, proper support for a long auger may be had at the beginning of a drilling operation, and kept during the full sinking of the hole.

As the drill head carriage moves forward, the hose line carriage 88 will be drawn forward also. As previously described, the carriage will move forward at the speed required to maintain the hose lines taut between the point of attachment 160 on the feed rack and the connection to the drill carriage.

When a hole has been completed, the drill can be retracted, as previously described, and the auger guide carriages and the hose line carriage will return to their original positions. The feed rack can then be shifted to a new location for another drilling by manipulation of the boom without moving the car.

In the drawings only two drill guides have been shown but more may be used if found to be desirable. In every instance, however, the drive for the auger guide carriages will cause proportional movement for the several carriages to maintain equally spaced support points between the fixed auger guide and the drill head carriage. In each instance, the auger guide carriage closest to the fixed guide may be considered to have a base travel rate and each succeeding auger guide carriage in the direction of the drill head carriage will have a travel rate which is a progressive multiple of the base rate and the drill head carriage speed will be the next higher multiple in the progression. In other words, in the embodiment shown, where two guide carriages are present, the rate of travel of the guide carriage 89 may be considered the basic rate. The carriage 90 will move at twice the base rate and the drill head carriage at three times the base rate. If three guide carriages were employed and the one next to the fixed guide had the base travel rate, the middle guide carriage of the three would move at twice the base rate, the guide carriage adjacent the drill head carriage at three times the base rate, and the drill head carriage at four times the base rate. The travel ratio will apply to any number of guide carirages necessary for proper support of the auger.

In view of the fact that feed jacks 100 are operable to maintain a predetermined continuous pressure upon the auger, the present feed rack is particularly adaptable for use with a rotary percussion drill of the type disclosed in the above mentioned co-pending application. The jacks can be used to offset oscillations of the percussion mechanism in a direction opposite to the drilling direction and to impose a predetermined force which will augment percussive force in the drilling direction.

While in the above one practical embodiment of the invention has been disclosed, it will be understood that the specific details of structure shown and described are merely by way of example, and the invention may take other forms within the scope of the appended claims.

What is claimed is:

1. A face drilling machine comprising, a mobile car, a boom mounted at one end of the car for vertical tilting and lateral swinging movement, means to tilt and swing the boom, a drill feed rack carried by the boom, means connected to the boom to maintain the drill feed rack horizontal and parallel to the longitudinal axis of the mobile car throughout vertical tilting and lateral swinging of the boom, a drill head carriage mounted on the feed rack for movement longitudinally of the feed rack, means to move the drill head carriage toward and from one end of the feed rack, a fixed auger guide at said one end of the feed rack, a pair of auger guide carriages mounted on the feed rack intermediate the fixed auger guide and the drill head carriage and movable longitudinally of the feed rack, the fixed auger guide, the auger guide carriages and the drill head carriage being equally spaced along the feed rack, means to drive the auger guide carriages with the auger guide carriage adjacent the drill head carriage moving at twice the rate of the auger guide carriage adjacent the fixed guide, a hose line carriage mounted on the feed rack on the opposite side of the drill head carriage from the auger guide carriages and movable along the feed rack, a reel freely rotatable on the hose line carriage, fluid hose lines attached to the feed rack at a mid-point and coupled to the drill head carriage, the hose lines passing around the reel intermediate the connections to the feed rack and drill head carriage, means to control the movement of the hose line carriage driven by the means to move the drill head carriage, the means to control the movement of the hose line carriage being connected to the means to drive the auger guide carriages to interconnect the auger guide carriage drive means and means to move the drill head carriage.

2. A face drilling machine having a support and a drill feed rack mounted on the support, the drill feed rack comprising, a pair of parallel rails extending longitudinally of the feed rack, a fixed auger guide mounted at one end of the feed rack, a drill head carriage mounted on the rails for sliding movement therealong toward and from the said one end of the feed rack, means to move the drill head carriage along the rails, two auger guide carriages slidably mounted on the rails intermediate the fixed auger guide and the drill head carriage, means interconnecting the auger guide carriages to cause the auger guide carriage adjacent the drill head carriage to move at twice the rate of the auger guide carriage adjacent the fixed guide, and means interconnecting the auger guide carriage interconnecting means and the means to move the drill head carriage to cause the auger guide carriages to move when the drill head carriage is moved and the travel rate of the drill head carriage to be three times that of the auger guide carriage adjacent the fixed auger guide, the means to move the drill head carriage including, a feed jack secured to the feed rack and having a movable operating member, drive member guides carried by the operating member at the front and rear thereof, drive member guides mounted at the front and at the rear of the feed rack, a flexible member anchored at one end to the front of the feed rack and trained over the drive member guides at the front of the operating member and the drive member guides at the front of the feed rack and having its other end attached to the drill head carriage, and a second flexible member anchored at one end to the rear of the feed rack and trained over the drive member guides at the rear of the operating member and the drive member guides at the rear of the feed rack and having its opposite end attached to the drill head carriage, whereby movement of the operating member will cause movement of the drill head carriage along the feed rack.

3. A face drilling machine as claimed in claim 2 wherein, the means interconnecting the auger guide carriages includes, a drive sprocket mounted at the rear of the feed rack, an auger drive member guide on the feed rack at the front, a forward auger drive member guide and a rearward auger drive member guide on the auger guide carriage adjacent the fixed auger guide, and a second flexible member which is in part at least a chain having one end anchored to the feed rack at the front and trained in sequence about the forward auger drive member guide on the auger guide carriage adjacent the fixed auger guide, the auger drive member guide on the feed rack at the front, the drive sprocket, the rearward auger drive member guide on the auger guide carriage adjacent the fixed auger guide and having its other end connected to said support, said second flexible member being fixedly connected to the auger guide carriage adjacent the drill head carriage.

4. A face drilling machine as claimed in claim 3 wherein the means interconnecting the auger guide carriage interconnecting means and the drill head carriage moving means includes, a control sprocket mounted for simultaneous movement with the drive sprocket of the auger guide carriage interconnecting means, and a chain movable with the jack operating member and passing around the control sprocket to rotate the control sprocket and the drive sprocket of the auger guide carriage interconnecting means.

5. A face drilling machine as claimed in claim 4 wherein, there is a hose line carriage mounted on the feed rack rails for movement therealong, a reel rotatably mounted on the hose line carriage, hose lines attached to the feed rack at a mid-point thereof and to the drill head carriage and passing around the reel intermediate its attachment to the drill head carriage and feed rack, and the chain passing around the control sprocket and movable with the jack operating member having one end connected to the hose line carriage.

References Cited by the Examiner

UNITED STATES PATENTS

| | | | |
|---|---|---|---|
| 1,834,701 | 12/31 | Gustafson | 173—147 |
| 2,703,222 | 3/55 | Feucht | 173—43 |
| 2,730,332 | 1/56 | Hale | 173—147 |
| 2,958,514 | 11/60 | Lee | 173—22 |
| 3,089,550 | 5/63 | Watson | 173—147 |

BROUGHTON G. DURHAM, *Primary Examiner.*